June 30, 1959  C. SCHUSTERIUS  2,892,988
ELECTRICAL RESISTANCE ELEMENTS AND METHOD OF
PRODUCING THE SAME
Filed March 10, 1955

INVENTOR.
Carl Schusterius
By
Patent Agent

United States Patent Office 2,892,988
Patented June 30, 1959

2,892,988

ELECTRICAL RESISTANCE ELEMENTS AND METHOD OF PRODUCING THE SAME

Carl Schusterius, Konigshofen i. Gr., Unterfranken, Germany

Application March 10, 1955, Serial No. 493,545
In France July 5, 1946

Public Law 619, August 23, 1954
Patent expires July 5, 1966

16 Claims. (Cl. 338—9)

The present invention relates to a method of producing electrical resistance elements, and more particularly such elements consisting of a mixture of a plurality of metal oxides.

Prior to this invention, resistance elements have been known to consist of semiconductors made of compounds of titanium oxide, copper oxide, and uranium oxide. Also, a large series of other oxide semiconductors have been known, such as those made, for example, of zinc oxide and cadmium oxide. The latter already constitutes a relatively good conductor at room temperatures, while the zinc oxide in a pure state is a very poor conductor (conductivity $10^{-7}$ ohm$^{-1}$ cm.$^{-1}$), its resistance, however, decreasing as the temperature increases. As a conductor of excess electrons, its conductivity increases as soon as the stoichiometrical ratio of metal to oxygen is disturbed by reduction, for example by heating in hydrogen. Also, the known resistance elements of magnesium titanate have previously been made in such a manner. Since resistors are all subject to being heated while in use, any resistance element the chemical condition of which is not in a state of balance with the air atmosphere must be fused into a glass vessel under a certain gas pressure, since otherwise, for example, in a conductor of excess electrons, i.e. a reduction semiconductor, reoxidation would occur as the temperature increases which would lead to a considerable decrease in conductivity.

It is the object of the present invention to devise a method of producing electrical resistance elements in which a mixture containing at least 60% of zinc oxide and 0.1 to 40% of at least one other metal oxide is sintered in an oxidizing atmosphere at temperatures between 900 and 1400° C.

Another object of the present invention is to conduct the sintering process so as to obtain porous or dense compounds, thus permitting the resistance also to be influenced considerably by the sintering condition of such compounds.

Generally speaking, resistance elements are being used which have a porosity of less than 5%.

If the resistors are being sintered in ordinary air, the state of balance will already occur during the sintering process. Such resistors may be used in the free air even at higher temperatures, for example, at 500° C., without any appreciable change in the rated value of the resistor.

If, however, the resistors are being sintered in a gas, the oxygen content of which has a partial pressure differing from that of the air, they should, before being finally installed, preferably be used for some time in the free air at the maximum operating temperature so as to adjust themselves to a constant resistance.

Resistance compounds may thus be produced with either a negative or a positive temperature coefficient. If a negative temperature coefficient be required or if the temperature characteristic is to be shifted toward the negative, oxides such as, for example, beryllium oxide, zirconium oxide, niobic oxide, iron oxide, aluminum oxide, tin oxide, thorium oxide, lanthanum oxide, neodymium oxide, cobalt oxide, magnesium oxide, calcium oxide, copper oxide, and the like, should be added to the zinc or cadmium oxide or mixtures thereof. The amount and the type of the addition determine to a certain extent the value of the specific resistance as well as the temperature coefficient. Thus, for example, such a compound may be formed of 95 parts of zinc oxide and 5 parts of calcium oxide.

If the resistance should have a positive temperature coefficient, other kinds of oxides, such as, for example, titanium dioxide or nickel oxide, should be added to the starting oxides. Suitable resistance compounds with a positive temperature coefficient may be obtained, for example, by the use of 80 parts of zinc oxide and 20 parts of nickel oxide. If the positive temperature coefficient obtained by titanium dioxide should be slightly reduced, beryllium oxide may, for example, be added thereto.

Thus, contrary to the methods known prior to this invention, the resistance value of the mentioned oxide mixtures is not determined by subjecting them to a reduction of different strength, but may be adjusted at a state of balance with the ordinary air atmosphere by the insertion of certain foreign atoms. This is of importance particularly, for example, if small resistors of only a few watts are to be installed in a very confined area and when space should be saved by omitting the glass bulbs thereof, or if in larger resistance units for purposes of voltage regulation or for motor starters the resistors have to have an output of many kilowatts, when it is highly desirable that the accompanying heat be dissipated very quickly.

The rated resistance value in the elements formed of the mentioned mixtures is variable within wide limits. Thus, for example, the resistance of the zinc oxide decreases from $10^6$ to $10^{-1}$ ohm/cm. if 5% of titanium dioxide be added. If a larger amount of titanium dioxide be added, the resistance values again begin to increase, and with an addition of 20% of titanium dioxide they already attain a value of $10^4$ ohm/cm. At a content of 35% of titanium dioxide, the original semiconductor has become a very good insulator.

If compounds with a relatively small negative temperature coefficient are to be produced, zirconium oxide, tin oxide, or the like, or mixtures thereof with or without an addition of titanium dioxide should preferably be added to the starting materials. In the first case mentioned, for example, 90% of zinc oxide and 10% of zirconium oxide may be used.

Compounds containing iron oxide already attain a high conductivity below 300° C. because of a large temperature coefficient, and they do not change thereafter to any considerable extent. A compound of this kind may, for example, consist of a mixture of 90% zinc oxide and 10% iron oxide.

When applying several oxides of the type mentioned in a certain mixing ratio with zinc oxide as a base, resistance compounds may be obtained, the conductivity of which will be practically constant, for example, up to 300° C., or may be at a minimum at a certain temperature. Thus, by combining several oxides in certain amounts, it is possible to obtain any desired resistance or resistance variation in response to the respective temperature.

The mentioned compounds may be built up into resistance elements of any desired shape. They may be made in the shape of thin rods or in a tubular form with a diameter of, for example, 10 cm. or more and be sintered in an electric furnace so as to oxidize. Such possibility of making the resistance elements of any desired shape makes it possible, for example, to produce tubes which are tapering toward one end. Thus, an uneven distribution of temperature along the length of the resistance element may be obtained in accordance with a predetermined curve. As a result of the reduction in the cross-sectional area, the tapered part of the resistor will be more strongly heated by the electric current passing therethrough. If the proper compounds be selected, it will thus even be possible to obtain a resistance element, one part of which has a positive and the other a negative temperature coefficient. Such quality is of great value in voltage regulators. Evidently, it is not necessary that the two parts of such resistance element with a positive and negative temperature coefficient be made in one piece or of the same compounds. They may be separate from each other thermally and interconnected electrically. Such voltage regulators made of the mentioned resistance compounds are not dependent upon any limitation as to their output if provision is made for adequately dissipating therefrom the heat developing therein during the operation. The possibility of making the resistance elements in any desired shape, and the fact that they do not have to be enclosed in a tube or other vessel allows them to be cooled with an air current which, if the resistance element is made of tubular shape, may, for example, be blown therethrough.

Resistance compounds with a positive temperature coefficient and resistance values higher than $10^2$ ohm/cm. may be used, for example, as current conductors in heating furnaces.

For finishing the resistance elements after being molded, they may be ground or etched. For supplying current to the resistance element, silver coatings or silver alloys with a higher melting point may, for example, be fused into the finished elements in a customary manner.

Examples of the new resistance elements are illustrated in the drawing, in which, Figure 1 shows a longitudinal section through an embodiment of a resistance element according to the invention, taken along the line 1—1 in Figure 2 and looking in the direction of the arrows;

Like parts in the different figures have the same reference numerals.

Figure 1:
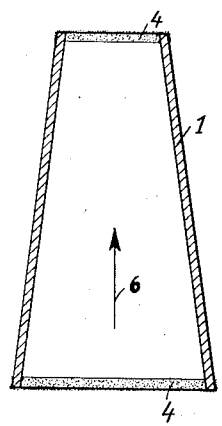
Figure 2:
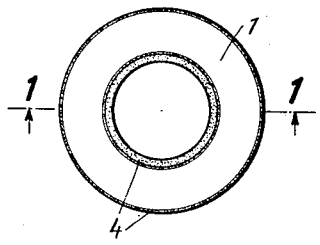
Figure 2 is a top view of the resistance element shown in Figure 1.

In the embodiment of Figures 1 and 2, a frusto-conical resistance body or element 1 is made in accordance with the invention of the materials described. The ends of the body or element 1 are covered by silver or silver alloy layers 4 which are applied thereto by fusing. These silver or silver alloy coated ends form the terminals of the resistance element to which current can be supplied. An arrow 6 in the interior of the resistance body 1 indicates the direction of an air current contributing to the mentioned non-uniform distribution of the temperature along the length of this body 1, said non-uniform distribution being primarily obtained as a result of the tapering cross section.

Figure 3:
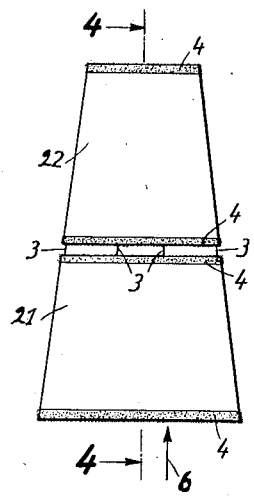
Figure 3 shows a side view of an embodiment of a divided resistance element according to this invention.
Figure 4:
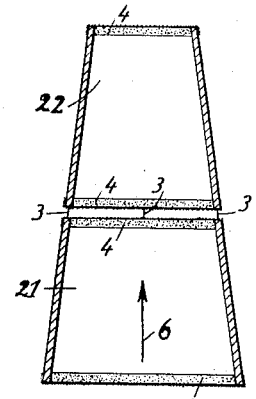
Figure 4 is a longitudinal section through the divided resistance element of Figure 3, taken along the line 4—4 and looking in the direction of the arrows.

According to the embodiment of Figures 3 and 4, the resistance element is divided into two frusto-conical bodies 21 and 22 which are arranged one above the other in such a manner that they form a composite frusto-conical structure which is sectionalized at about its center where the two bodies 21 and 22 are spaced by a small gap to obtain thermal separation. Electric conductors or wires 3 connect the ends of the bodies 21 and 22, which are opposite one another at the thermally separating gap. These body ends are also provided with fused silver or silver alloy coatings 4 to obtain superior terminal connections.

Figure 5:
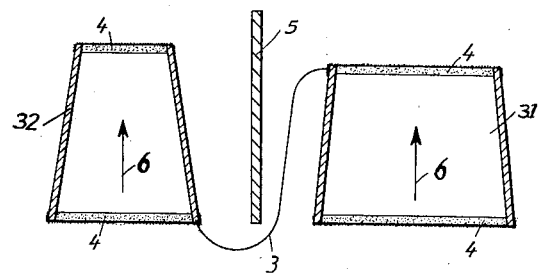
Figure 5 is a longitudinal section through another divided resistance element according to the present invention.

In Figure 5, two frusto-conical bodies 31 and 32 are entirely thermally separated, i.e., they are arranged side by side and are insulated or shielded from one another by means of a heat-insulating and/or radiation-preventing shield or wall 5. A conductor 3 passed around an edge of the shield 5 serves as electric connection of the separated bodies 31 and 32 in principally the same manner as in the embodiment of Figures 3 and 4.

While I have described my invention with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A method of producing electric resistance elements having a positive temperature coefficient of resistance, comprising the steps of forming a mixture of at least 60% of zinc oxide with at least one of the oxides of metals selected from the group consisting of titanium and nickel, and sintering said mixture at temperatures between 900° and 1400° C. within an oxidizing atmosphere.

2. A method according to claim 1, wherein one of the oxides of said selected metal group is titanium dioxide.

3. A method according to claim 1, wherein said mixture contains also at least one oxide of metals selected from the group consisting of zirconium, magnesium, beryllium, aluminum, calcium and tin.

4. A method according to claim 1, wherein said mixture is sintered to form a dense resistance element.

5. A method according to claim 1, wherein said mixture is sintered in air.

6. An electric resistance element produced by the method according to claim 1, wherein said resistance element comprises a tubular frusto-conically shaped body.

7. An electric resistance element comprising a tubular frusto-conical body of a sintered mixture of at least 60% of zinc oxide with at least one of the oxides of metals selected from the group consisting of titanium and nickel.

8. An electric resistance element according to claim 7, wherein one of the oxides of said selected metal group is titanium dioxide.

9. An electric resistance element according to claim 7, wherein said sintered mixture contains also at least one oxide of metals selected from the group consisting of zirconium, magnesium, beryllium, aluminum, calcium and tin.

10. An electric resistance element according to claim 7, wherein silver layers are fused at the ends of said resistance body, said layers serving as electric terminals.

11. An electric resistance element according to claim 7, wherein layers of a silver alloy having a melting point higher than silver are fused at the ends of said resistance body, said layers serving as electric terminals.

12. An electric resistance element according to claim 7, wherein said frusto-conically shaped body is joined at one of its ends to another frusto-conically shaped tubular resistance body having a negative temperature coefficient of resistance.

13. An electric resistance element according to claim 12, wherein said two tubular frusto-conically shaped resistance bodies are separated so as to be in thermally non-conductive relation and electrically connected with one another.

14. In a metallurgic composition for forming electrical resistance elements and the like, a densely sintered mixture of at least 60% of zinc oxide with at least one of the oxides of metals selected from the group consisting of titanium and nickel.

15. In a metallurgic composition according to claim 14, one of the oxides of said selected metal group being titanium dioxide.

16. In a metallurgic composition according to claim 14, said sintered mixture also containing at least one oxide of metals selected from the group consisting of zirconium, magnesium, beryllium, aluminum, calcium and tin.

References Cited in the file of this patent

UNITED STATES PATENTS

| | | |
|---|---|---|
| 648,518 | Ochs | May 1, 1900 |
| 1,181,800 | Randolph | May 2, 1916 |
| 2,407,750 | Smith | Sept. 17, 1946 |

FOREIGN PATENTS

| | | |
|---|---|---|
| 586,064 | Great Britain | Mar. 5, 1947 |